US012567149B2

(12) United States Patent
Jeong et al.

(10) Patent No.: US 12,567,149 B2
(45) Date of Patent: Mar. 3, 2026

(54) METHOD AND APPARATUS FOR TRAINING IMAGE PROCESSING MODEL, AND STORAGE MEDIUM STORING INSTRUCTIONS TO PERFORM METHOD FOR TRAINING IMAGE PROCESSING MODEL

(71) Applicant: Suprema Inc., Seongnam-si (KR)

(72) Inventors: Cheol Hee Jeong, Seongnam-si (KR); Kideok Lee, Seongnam-si (KR)

(73) Assignee: Suprema Inc., Seongnam-si (KR)

( * ) Notice: Subject to any disclaimer, the term of this patent is extended or adjusted under 35 U.S.C. 154(b) by 285 days.

(21) Appl. No.: 18/518,236

(22) Filed: Nov. 22, 2023

(65) Prior Publication Data

US 2025/0139780 A1 May 1, 2025

(30) Foreign Application Priority Data

Oct. 30, 2023 (KR) ........................ 10-2023-0147218

(51) Int. Cl.
*G06T 7/10* (2017.01)

(52) U.S. Cl.
CPC ...... *G06T 7/10* (2017.01); *G06T 2207/10024* (2013.01); *G06T 2207/10048* (2013.01)

(58) Field of Classification Search
CPC ..... G06T 7/10–194; G06T 2207/10048; G06T 2207/20084; G06T 2207/10024; G06V 10/774; G06N 3/0475; G06N 3/08–0985
See application file for complete search history.

(56) References Cited

U.S. PATENT DOCUMENTS

| | | | | |
|---|---|---|---|---|
| 2023/0230373 A1* | 7/2023 | Picon Ruiz | .............. | G06N 3/08 382/110 |
| 2025/0117980 A1* | 4/2025 | Ren | ........................ | G06V 10/774 |
| 2025/0117981 A1* | 4/2025 | Ren | ........................ | G06T 11/001 |

FOREIGN PATENT DOCUMENTS

JP 2021-060840 A 4/2021

OTHER PUBLICATIONS

Peng, Xishuai et al., "RGB-NIR image categorization with prior knowledge transfer.", EURASIP Journal on Image and Video Processing, 2018, 2018: 1-11.

(Continued)

*Primary Examiner* — Sean T Motsinger
(74) *Attorney, Agent, or Firm* — Bridgeway IP Law Group, PLLC; Jihun Kim

(57) ABSTRACT

There is provided a method for training an image processing model. The method comprises preparing the image processing model including a first generative model, a second generative model, and a segmentation model; inputting a first RGB image into the first generative model and determining a near-infrared ray (NIR) image as an output of the first generative model; inputting the NIR image into the second generative model and determining a second RGB image as an output of the second generative model; inputting the first RGB image and the second RGB image into a segmentation model and determining a first segmentation image and a second segmentation image as outputs of the segmentation model; and setting parameters of the first generative model based on an error between the first RGB image and the second RGB image and an error between the first segmentation image and the second segmentation image.

6 Claims, 4 Drawing Sheets

(56) References Cited

OTHER PUBLICATIONS

Choe, Gyeongmin et al., "RANUS: RGB and NIR urban scene dataset for deep scene parsing.", IEEE Robotics and Automation Letters, 2018, 3.3: 1808-1815.

Examiner, "Notice of Allowance in Korean Application No. 10-2023-0147218", Oct. 29, 2024, KIPO, Republic of Korea.

Artzai Picon et al., "Deep convolutional neural network for damaged vegetation segmentation from RGB images based onvirtual NIR-channel estimation", Artificial Intelligence in Agriculture vol. 6, pp. 199-210 URL:https://www.sciencedirect.com/science/article/pii/S2589721722000149 (Sep. 24, 2022).

Svetlana Illarionova et al., "Generation of the NIR Spectral Band for Satellite Images With Convolutional Neural Networks", Sensors 2021,21(16),5646;, pp. 1-10, URL:https://www.mdpi.com/1424-8220/21/16/5646(Aug. 21, 2021).

* cited by examiner

METHOD AND APPARATUS FOR TRAINING IMAGE PROCESSING MODEL, AND STORAGE MEDIUM STORING INSTRUCTIONS TO PERFORM METHOD FOR TRAINING IMAGE PROCESSING MODEL

CROSS-REFERENCE TO RELATED APPLICATIONS

This application claims the priority of Korean Patent Application No. 10-2023-0147218 filed on Oct. 30, 2023, in the Korean Intellectual Property Office, the disclosure of which is incorporated herein by reference.

TECHNICAL FIELD

The present disclosure relates to a method for training an image processing model, an apparatus for training an image processing model, and an image processing apparatus using a pre-trained image processing model.

This work was partly supported by Korea Internet & Security Agency (KISA) grant funded by the Korea government (MSIT; Ministry of Science and ICT) (No. KISA-2023-16, Development of a high-performance embedded face recognition module based on cross-recognition technology between heterogeneous cameras).

BACKGROUND

In order to apply various algorithms for enhancing security in an access control system using facial recognition, a significant number of RGB facial images and near-infrared (NIR) facial images are required in the training process.

While RGB facial images are easily obtainable, NIR facial images are relatively challenging to obtain compared to RGB images.

As a result, an approach to generate NIR facial images using deep learning models has been explored. According to existing techniques, a first RGB facial image is input into a first deep learning model to obtain NIR images as an output of the first model. The acquired NIR image is then input into a second deep learning model to obtain a second RGB facial image as an output of the second model. Here, parameters of the first deep learning model are set to minimize any error between the first RGB facial image and the second RGB facial image.

However, according to the existing techniques, the quality of NIR facial images is significantly influenced by the quality of the first RGB image, often making them unusable in the training process.

SUMMARY

In view of the above, the present disclosure provides an image processing apparatus for optimizing parameters of a generative model using a segmentation image, which is obtained using a segmentation model, and a learning method thereof.

The aspects of the present disclosure are not limited to the foregoing, and other aspects not mentioned herein will be clearly understood by those skilled in the art from the following description.

In accordance with an aspect of the present disclosure, there is provided a method for training an image processing model to be performed by an image processing apparatus including a memory and a processor, the method comprises:

preparing the image processing model including a first generative model, a second generative model, and a segmentation model; inputting a first RGB image into the first generative model and determining a near-infrared ray (NIR) image as an output of the first generative model; inputting the NIR image into the second generative model and determining a second RGB image as an output of the second generative model; inputting the first RGB image and the second RGB image into a segmentation model and determining a first segmentation image and a second segmentation image as outputs of the segmentation model; and setting parameters of the first generative model based on an error between the first RGB image and the second RGB image and an error between the first segmentation image and the second segmentation image.

The determining of the parameters of the first generative model may include determining parameter values to be applied to the first generative model to minimize the error between the first RGB image and the second RGB image; and calibrating the determined parameter values to minimize the error between the first segmentation image and the second segmentation image and then applying the calibrated parameter values to the parameters of the first generative model. In accordance with another aspect of the present disclosure, there is provided an image processing apparatus, the apparatus comprises: a memory configured to store an image processing model including a first generative model, a second generative model, and a segmentation model, and one or more instructions; and a processor configured to execute the one or more instructions stored in the memory, wherein the instructions, when executed by the processor, cause the processor to: input a first RGB image into the first generative model and determine an NIR image as an output of the first generative model; input the NIR image into the second generative model and determine a second RGB image as an output of the second generative model; input the first RGB image and the second RGB image into the segmentation model and determine a first segmentation image and a second segmentation image as outputs of the segmentation model; and set parameters of the first generative model based on an error between the first RGB image and the second RGB image and an error between the first segmentation image and the second segmentation image.

In accordance with another aspect of the present disclosure, there is provided a non-transitory computer-readable recording medium storing a computer program, which comprises instructions for a processor to perform a method for training an image processing model, the method comprise: preparing the image processing model including a first generative model, a second generative model, and a segmentation model; inputting a first RGB image into the first generative model and determining a near-infrared ray (NIR) image as an output of the first generative model; inputting the NIR image into the second generative model and determining a second RGB image as an output of the second generative model; inputting the first RGB image and the second RGB image into a segmentation model and determining a first segmentation image and a second segmentation image as outputs of the segmentation model; and setting parameters of the first generative model based on an error between the first RGB image and the second RGB image and an error between the first segmentation image and the second segmentation image.

According to one embodiment, it is possible to optimize parameters of a generative model using a segmentation image which is obtained using a segmentation model. The generative model with the optimized parameters has the effect of providing a high-quality NIR image for an input RGB image.

DETAILED DESCRIPTION

Figure 1:
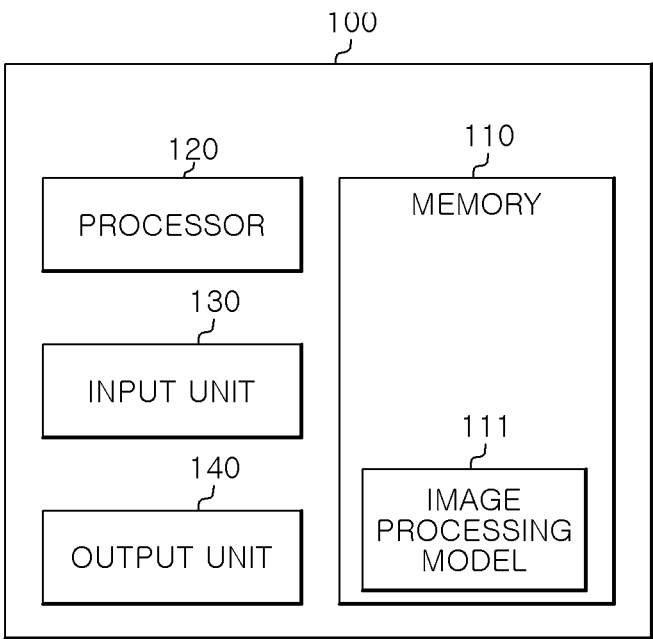
FIG. 1 is a diagram illustrating a configuration of an apparatus for training an image processing model according to an embodiment of the present disclosure.

The advantages and features of the embodiments and the methods of accomplishing the embodiments will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

Terms used in the present specification will be briefly described, and the present disclosure will be described in detail.

In terms used in the present disclosure, general terms currently as widely used as possible while considering functions in the present disclosure are used. However, the terms may vary according to the intention or precedent of a technician working in the field, the emergence of new technologies, and the like. In addition, in certain cases, there are terms arbitrarily selected by the applicant, and in this case, the meaning of the terms will be described in detail in the description of the corresponding invention. Therefore, the terms used in the present disclosure should be defined based on the meaning of the terms and the overall contents of the present disclosure, not just the name of the terms.

When it is described that a part in the overall specification "includes" a certain component, this means that other components may be further included instead of excluding other components unless specifically stated to the contrary.

In addition, a term such as a "unit" or a "portion" used in the specification means a software component or a hardware component such as FPGA or ASIC, and the "unit" or the "portion" performs a certain role. However, the "unit" or the "portion" is not limited to software or hardware. The "portion" or the "unit" may be configured to be in an addressable storage medium, or may be configured to reproduce one or more processors. Thus, as an example, the "unit" or the "portion" includes components (such as software components, object-oriented software components, class components, and task components), processes, functions, properties, procedures, subroutines, segments of program code, drivers, firmware, microcode, circuits, data, database, data structures, tables, arrays, and variables. The functions provided in the components and "unit" may be combined into a smaller number of components and "units" or may be further divided into additional components and "units".

Hereinafter, the embodiment of the present disclosure will be described in detail with reference to the accompanying drawings so that those of ordinary skill in the art may easily implement the present disclosure. In the drawings, portions not related to the description are omitted in order to clearly describe the present disclosure.

Figure 2:
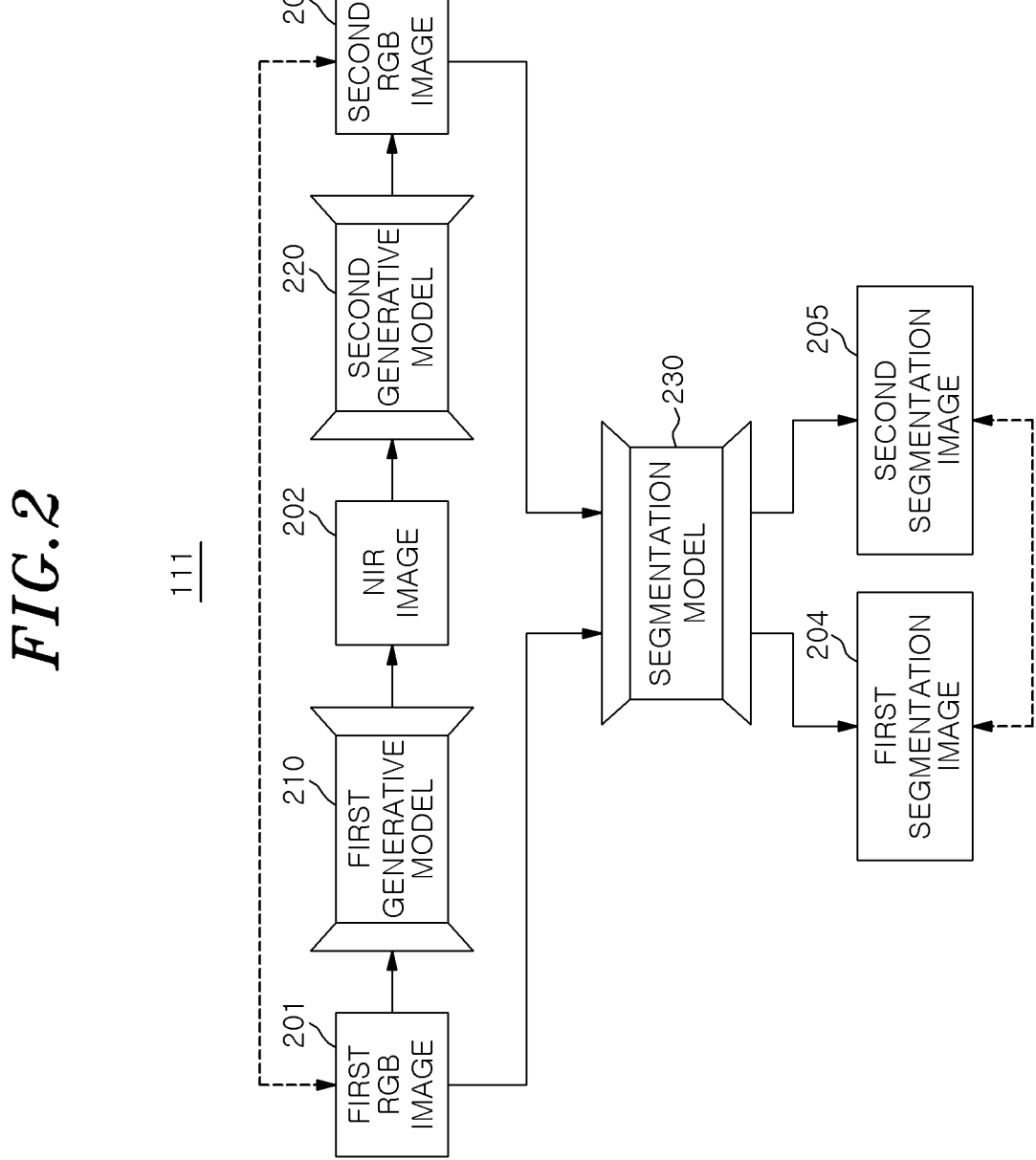
FIG. 2 is a diagram illustrating a configuration of an image processing model installed in the apparatus shown in FIG. 1.

FIG. 1 is a diagram illustrating a configuration of an apparatus for training an image processing model according to an embodiment of the present disclosure, and FIG. 2 is a diagram illustrating a configuration of an image processing model installed in the apparatus shown in FIG. 1.

Referring to FIGS. 1 and 2, an apparatus for training an image processing model 100 includes a memory 110 equipped with an image processing model 111, and a processor 120. Also, the apparatus 100 may further include an input unit 130 and/or an output unit 140.

The memory 110 may be equipped with the image processing model 111 including instructions to be executed by the processor 120, and may further store various information required for execution of the image processing model 111.

The image processing model 111 includes a first generative model 210, a second generative model 220, and a segmentation model 230.

The first generative model 210 of the image processing model 111 is trained to output an NIR image corresponding to an input RGB image. When a first RGB image 201 is input to the trained first generative model 210, the trained first generative model 210 outputs an NIR image 202 corresponding to the first RGB image 201.

The second generative model 220 of the image processing model 111 is trained to output a RGB image corresponding to an NIR image. When the NIR image 202 is input to the trained second generative model 220, the trained second generative model 220 outputs a second RGB image 203 corresponding to the NIR image 202.

The segmentation model 230 is trained to output a segmentation image corresponding to an input RGB. When the first RGB image 201 is input to the trained segmentation model 230, the trained segmentation model 230 generates a first segmentation image 204 corresponding to the first RGB image 201. When the second RGB image 203 is input to the trained segmentation model 230, the trained segmentation model 230 outputs a second segmentation image 205 corresponding to the second RGB image 203. Here, a segmentation image refers to an image in which one or more objects present in an RGB image are identified to enhance their distinctiveness from the surrounding areas. For example, in the case of a human facial RGB image, a segmentation image may be an image where distinctiveness for objects like eyes, nose, and mouth is enhanced from the surrounding areas.

The processor 120 loads the image processing model 111 by executing an instruction stored in the memory 110, and performs data processing according to the image processing model 111. This processor 120 may be comprised of one or multiple processors. For example, one or more processors may be general-purpose processors such as central processing unit (CPU), digital signal processor (DSP), or specialized graphics processors such as graphics processing unit (GPU), vision processing unit (VPU), or artificial intelligence-specific processors like neural processing unit (NPU). Through the image processing model 111, the processors 120 inputs the first RGB image 201 into the first generative model 210 and determine the NIR image 202 as an output of the first generative model 210. Subsequently, the image processing model 111 inputs the NIR image 202 into the second generation model 220 and determine the second RGB image 203 as an output of the second generative model 220. Then, the processor 120 inputs the first RGB image 201 and the second RGB image 203 into the segmentation model 230 and determine the first segmentation image 204 and the second segmentation image 205 as outputs of the segmentation model 230. In addition, based on an error between the first RGB image 201 and the second RGB image 203 as well as an error between the first segmentation image 204 and the second segmentation image 205, the processor 120 set parameters of the first generative model 201. Here, the processor 120 may determine parameter values to be applied to the first generative model 210 to minimize the error between the first RGB image 201 and the second RGB image 203, and may calibrate the determined parameter values to minimize the error between the first segmentation image 204 and the second segmentation image 205 and apply the calibrated parameter values to the parameters of the first generative model 210 for optimization.

The input unit 130 may receive various information required for the processor 120 to execute the image processing model 111. Such various information may be input in real time, and if input in advance, the information may be stored in the memory 110. For example, the input unit 130 may receive an image set for initial training of the first generative model 210 in the image processing model 111, an image set for initial training of the second generative model 210, and an image set for initial training of the segmentation model 230. In addition, the first RGB image 201 for parameter optimization of the first generative model 210 may be input.

The output unit 140 may output various processed data generated as a result of execution of the image processing model 111 by the processor 120. For example, the output unit 140 may include a data interface that can output various processing data to external peripheral devices, a communication module that can transmit various processing data through a communication channel, etc. For example, when training of the image processing model 111 is completed, the output unit 140 may output the NIR image 202 generated by the first generative model 210.

Although not shown in FIG. 2, the first RGB image 201 may be input to the first generative model 210 through a preprocessor (not shown). For example, if the first RGB image 201 is a human facial RGB image, the preprocessor (not shown) may input the first RGB image 201 into the first generative model 210 after performing face region alignment and histogram equalization based on eye coordinates extracted from facial landmark information of the first RGB image 201. In the following, a description of the preprocessor (not shown) will be omitted.

Figure 3:
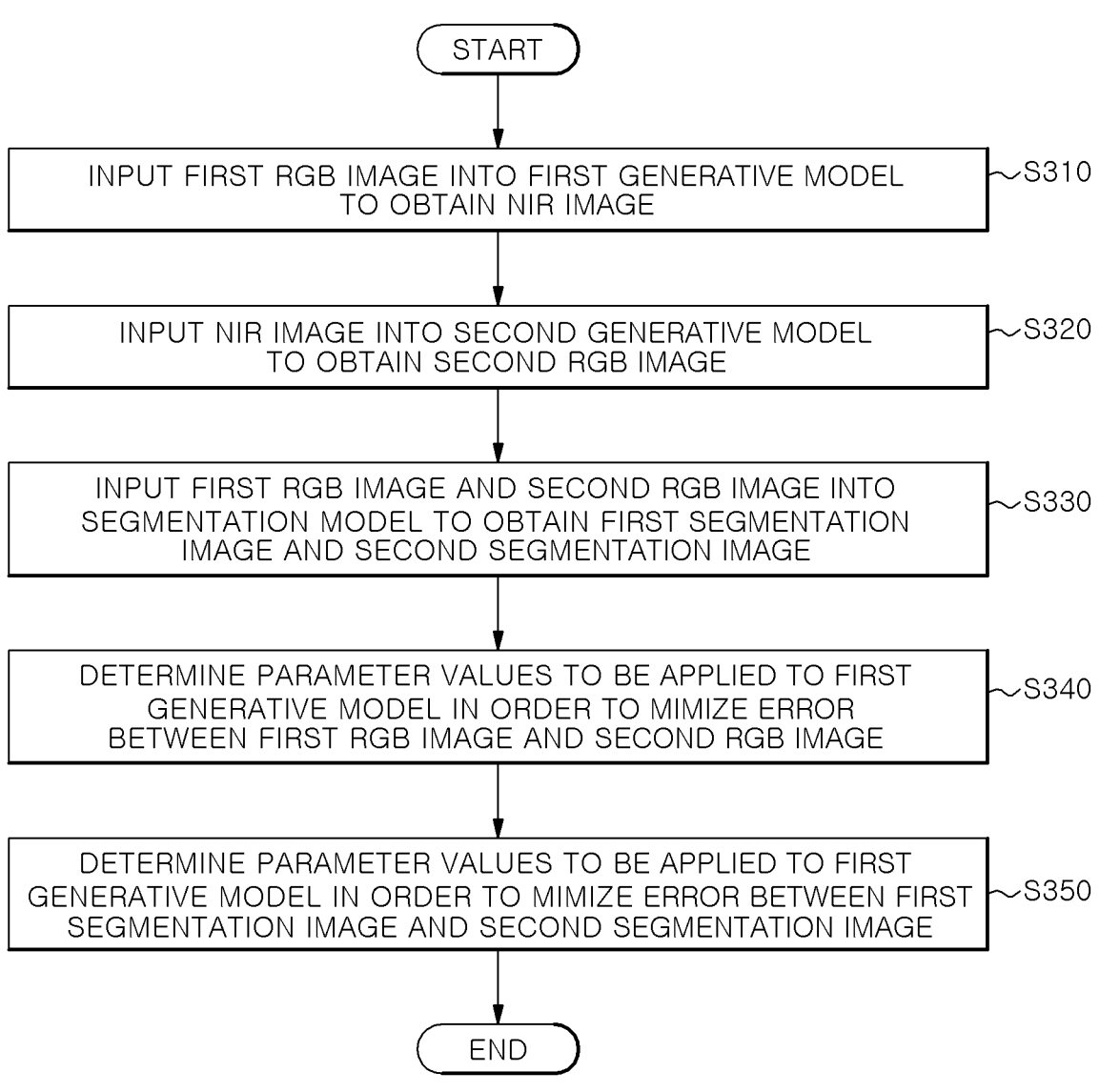
FIG. 3 is a flowchart for explaining a method for training an image processing model according to an embodiment of the present disclosure.

FIG. 3 is a flowchart for explaining a method for training an image processing model according to an embodiment of the present disclosure.

Hereinafter, the apparatus 100 including the image processing model 111 to perform training on the image processing model 111 and a method for processing an input image using the trained image processing model 111 will be described with reference to FIGS. 1 to 3.

First, the processor 120 of the apparatus 100 may load the image processing model 111 by executing an instruction stored in the memory 110, train the image processing model 111, and process an input image using the trained image processing model 111.

The processor 120 may initially train the first generative model 210 of the loaded image processing model 111 to output an NIR image corresponding to an input RGB image. The processor 120 may also initially train the second generative model 220 to output an RGB image corresponding to an input NIR image. In addition, the processor 120 may initially train the segmentation model 230 to output a segmentation image corresponding to an input RGB image.

In addition, the processor 120 may perform parameter optimization of the first generative model 210 with respect to the initially trained image processing model 111. When the first RGB image 201 is input through the input unit 130, the processor 120 inputs the first RGB image 201 to the first generative model 210 to obtain the NIR image 202 as an output of the first generative model 210 in operation S310.

Subsequently, the processor 120 inputs the NIR image 202 into the second generative model 220 to obtain the second RGB image 203 as an output of the second generative model 220 in operation S320.

Then, the processor 120 inputs the first RGB image 201 and the second RGB image 203 into the segmentation model 230 and determine the first segmentation image 204 and the second segmentation 205 as outputs of the segmentation model 230. Here, there is no specific recommendation regarding the order in which the first RGB image 201 and the second RGB image 203 are input to the segmentation model 230. The first RGB image 201 may be input first or the second RGB image 203 may be input first. In addition, if the segmentation model 230 is capable of processing a plurality of RGB images in parallel, the first RGB image 201 and the second RGB image 203 may be input simultaneously. In addition, a process of inputting the first RGB image 201 into the segmentation model 230 is independent of the operation of the second generative model 220. Therefore, the process may be performed before operation S310, concurrently with operation S310, or after operation S310 in operation S330.

Thereafter, the processor 120 sets parameters of the first generative model 201 based on an error between the first RGB image 201 and the second RGB image 203 and an error between the first segmentation image 204 and the second segmentation image 205. For example, the processor 120 determines parameter values to be applied to the first generative model 210 in order to minimize the error between the first RGB image 201 and the second RGB image 203 in operation S340, and calibrate the determined parameter values to minimize the error between the segmentation image 204 and the second segmentation image 205 and apply the calibrated parameter values to the parameters of the first generative model 210 for optimization in operation S350.

For example, if the first RGB image 201 is a RGB image of a face region and parameter values determined in the step S340 is applied to the first generative model 210, objects of the NIR image 202 output by the first generation model 201, such as eyes, nose, and mouth, may have low distinguishability from the surrounding area. Meanwhile, when the calibrated parameter values calibrated in the step S350 is applied to the parameters of the first generative model 210, the training effect on the first segmentation image 204 and the second segmentation image 205, which improved the discrimination of objects such as eyes, nose, and mouth from the surrounding area, is reflected. Thus, the existing in the NIR image 202 Discrimination between objects and surrounding areas in the NIR image 202 is improved.

Meanwhile, after training and parameter optimization for the image processing model 111 is completed, the trained first generative model 210 may be used to generate an NIR image. That is, the image processing model 111 not equipped with the second generative model 220 and the segmentation model 230 may be used. With the training and parameter optimization of the image processing model 111 completed, when the first RGB image 201 is input through the input unit 130, the processor 120 inputs the first RGB image 201 into the first generative model 210 and the NIR image 202 output from the generative model 210 is output through the output unit 140 under the control of the processor 120.

As described above, parameters of a generative model are optimized using a segmentation image obtained using a segmentation model. The generative model with the optimized parameters has the effect of providing a high-quality NIR image for an input RGB image.

Meanwhile, each of the operations included in the image processing method according to the embodiment described above may be implemented in a computer-readable recording medium for storing a computer program programmed to perform each of the operations.

Additionally, each of the operations included in the image processing method according to the embodiment described above may be implemented as a computer program stored in a computer-readable recording medium and programmed to perform each of the operations.

Figure 4:
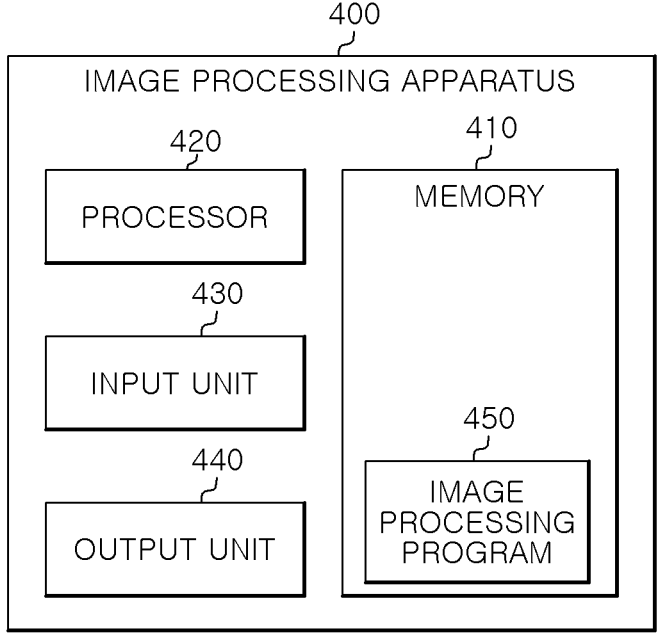
FIG. 4 is a block diagram showing an image processing apparatus according to an embodiment.

FIG. 4 is a block diagram showing an image processing apparatus according to an embodiment.

Referring to FIG. 4, the image processing apparatus 400 may include a processor 410, an input device 420, and a memory 430.

The processor 410 may generally control the operation of the image processing apparatus 400.

The processor 410 may receive data necessary to process an image processing model using the input device 420.

Although the image processing apparatus 400 receives data necessary to process the image processing model using the input device 420 in this specification, the present disclosure is not limited thereto. That is, according to an embodiment, the image processing apparatus 400 may include a receiver (not shown) in addition to or instead of the input device 420, and the image processing apparatus 400 may receive data necessary to process the image processing model using the receiver. Accordingly, the input device 420 and/or the receiver (not shown) may be collectively referred to as an acquisition unit (not shown).

The memory 430 may store an image processing program 450 and data necessary to execute the image processing program 450.

The processor 410 may process the image processing model using the image processing program 450. Herein the image processing model may include a neural network trained by the apparatus for training the image processing model 100 described in the FIG. 1.

Combinations of steps in each flowchart attached to the present disclosure may be executed by computer program instructions. Since the computer program instructions can be mounted on a processor of a general-purpose computer, a special purpose computer, or other programmable data processing equipment, the instructions executed by the processor of the computer or other programmable data processing equipment create a means for performing the functions described in each step of the flowchart. The computer program instructions can also be stored on a computer-usable or computer-readable storage medium which can be directed to a computer or other programmable data processing equipment to implement a function in a specific manner. Accordingly, the instructions stored on the computer-usable or computer-readable recording medium can also produce an article of manufacture containing an instruction means which performs the functions described in each step of the flowchart. The computer program instructions can also be mounted on a computer or other programmable data processing equipment. Accordingly, a series of operational steps are performed on a computer or other programmable data processing equipment to create a computer-executable process, and it is also possible for instructions to perform a computer or other programmable data processing equipment to provide steps for performing the functions described in each step of the flowchart.

In addition, each step may represent a module, a segment, or a portion of codes which contains one or more executable instructions for executing the specified logical function(s). It should also be noted that in some alternative embodiments, the functions mentioned in the steps may occur out of order. For example, two steps illustrated in succession may in fact be performed substantially simultaneously, or the steps may sometimes be performed in a reverse order depending on the corresponding function.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

What is claimed is:

1. A method for training an image processing model to be performed by an image processing apparatus including a memory and a processor, the method comprising:

preparing the image processing model including a first generative model, a second generative model, and a segmentation model;

inputting a first RGB image into the first generative model and determining a near-infrared ray (NIR) image as an output of the first generative model;

inputting the NIR image into the second generative model and determining a second RGB image as an output of the second generative model;

inputting the first RGB image and the second RGB image into a segmentation model and determining a first segmentation image and a second segmentation image as outputs of the segmentation model; and setting parameters of the first generative model based on an error between the first RGB image and the second RGB image and an error between the first segmentation image and the second segmentation image.

2. The method of claim 1, wherein the determining of the parameters of the first generative model comprises:

determining parameter values to be applied to the first generative model to minimize the error between the first RGB image and the second RGB image; and calibrating the determined parameter values to minimize the error between the first segmentation image and the second segmentation image and then applying the calibrated parameter values to the parameters of the first generative model.

3. An apparatus for training an image processing model, the apparatus comprising:

a memory configured to store a pre-trained image processing model including a first generative model, a second generative model, and a segmentation model, and one or more instructions; and a processor configured to execute the one or more instructions stored in the memory, wherein the instructions, when executed by the processor, cause the processor to:

input a first RGB image into the first generative model and determine an NIR image as an output of the first generative model;

input the NIR image into the second generative model and determine a second RGB image as an output of the second generative model;

input the first RGB image and the second RGB image into the segmentation model and determine a first segmentation image and a second segmentation image as outputs of the segmentation model; and set parameters of the first generative model based on an error between the first RGB image and the second RGB image and an error between the first segmentation image and the second segmentation image.

4. The apparatus of claim 3, wherein the processor is configured to determine parameter values to be applied to the first generative model to minimize the error between the first RGB image and the second RGB image, calibrate the parameter values to minimize the error between the first segmentation image and the second segmentation image, and apply the calibrated parameter values to the parameters of the first generative model.

5. A non-transitory computer readable storage medium storing computer executable instructions, wherein the instructions, when executed by a processor, cause the processor to perform a method for training an image processing model, the method comprising:

preparing the image processing model including a first generative model, a second generative model, and a segmentation model;

inputting a first RGB image into the first generative model and determining a near-infrared ray (NIR) image as an output of the first generative model;

inputting the NIR image into the second generative model and determining a second RGB image as an output of the second generative model;

inputting the first RGB image and the second RGB image into a segmentation model and determining a first segmentation image and a second segmentation image as outputs of the segmentation model; and setting parameters of the first generative model based on an error between the first RGB image and the second RGB image and an error between the first segmentation image and the second segmentation image.

6. The non-transitory computer readable storage medium of claim 5, wherein the determining of the parameters of the first generative model comprises:

determining parameter values to be applied to the first generative model to minimize the error between the first RGB image and the second RGB image; and calibrating the determined parameter values to minimize the error between the first segmentation image and the second segmentation image and then applying the calibrated parameter values to the parameters of the first generative model.

* * * * *